Patented Sept. 10, 1935

2,014,077

UNITED STATES PATENT OFFICE 2,014,077

AMYL SUBSTITUTION PRODUCT OF AMYLENE DIAMINE AND PROCESS OF PRODUCING SAME

Melville M. Wilson, Chicago, Ill., assignor to The Sharples Solvents Corporation, Philadelphia, Pa., a corporation of Delaware No Drawing. Application June 21, 1932, Serial No. 618,471

22 Claims. (Cl. 260—127)

This invention relates to certain new amine substitution and addition products and to methods of making these products. It also relates to the use of the new products in the protection of vegetable matter against injurious animal life.

It is well known that vegetable matter including plants, bushes, trees, fruit, flowers and vegetables are injured or destroyed by various types of animal life, including insects such as aphids and fruit flies, hard or scale-like animal organisms, and worms. The term animal life will be used herein to include and to designate such types of life as distinguished from rodents and other vertebrate animals which consume or otherwise destroy vegetable matter. Any substance which serves to protect vegetable matter against injurious animal life as above defined is to be regarded herein as an insecticide.

It has been proposed heretofore to protect vegetable matter against animal life by spraying the vegetable matter with solutions or emulsions of nicotine or of lead arsenate, or of cyanides, or by subjecting the vegetable matter to hydrocyanic acid gas. Such substances are, however, relatively costly, or are available in limited quantities, and are likely to remain in part upon fruits or vegetables, and persons eating them are frequently poisoned. For this reason, many foreign countries have prohibited the importation of fruit which contains over a specific amount of lead arsenate. The use of hydrocyanic acid gas is dangerous to those attempting to apply it, and the application of the gas to the vegetable matter is difficult and costly, and frequent applications are highly injurious to vegetable matter.

It is a purpose of this invention in its application to the protection of vegetable life from injurious animal life to afford an insecticide, as broadly defined herein, which is highly toxic to injurious animal life, but which is neither injurious to vegetable life nor to persons who might eat fruit or vegetables having the insecticide applied thereto. It is a further purpose of this invention to produce an insecticide having physical characteristics which make it desirable from the point of view of its spreading and adhesive properties, and of its solubility or colloidal dispersibility in spraying vehicles. It is a further purpose of this invention to afford an insecticide which may be simply and economically produced.

The new chemical compounds and mixtures which I have found to possess effective insecticidal properties are certain organic derivatives of ammonia, namely, compounds produced by the reaction of amyl amines with amyl halides. These substances I have found to be highly toxic to injurious animal life but neither to be injurious to persons nor, at the state of dilution used, to the most tender vegetable life to which they are applied. Moreover, in consequence of their volatility, they disappear from the fruit after they have served their function as an insecticide and are never found present on fruit or vegetables after they have been placed on the market. They can also be manufactured at very moderate expense.

I have found that a composition of matter having excellent insecticidal properties may be produced by the following novel procedure.

Monoamyl amine and amylene dichloride are reacted, at a temperature of approximately 100° C. under a pressure of about 25 pounds per square inch for a period of approximately 55 hours. Amyl alcohol is also preferably mixed with the amine and the dichloride prior to the heating step. Upon cooling, the reaction mass solidifies in the form of brown crystals, the brown color being probably derived from the iron of the autoclave. The reaction mixture is then distilled to drive off unreacted amyl amine, amyl alcohol, and amylene dichloride. The remaining mixture is then treated with a sodium hydroxide solution.

As an illustrative embodiment of the practice of my invention, the following illustrative example is given. Equimolecular proportions of amyl amine, amylene dichloride and amyl alcohol are placed in an autoclave provided with a shaking or stirring device. The autoclave is closed and external heat is applied until a temperature of about 100° to 105° C. and a pressure of 25 pounds per square inch are obtained. These conditions of temperature and pressure are maintained until the reaction has attained a state of substantial equilibrium. At the described conditions of temperature and pressure, this requires approximately 55 hours of heating, but the reaction period may be reduced to 8 hours by maintaining a temperature of 140° C. and a pressure of 60 pounds per square inch. Continuous stirring or shaking of the reaction mass during this entire treatment period is unnecessary, but it should be at least intermittently stirred or shaken, as such treatment tends to increase the yield and reduce the time of reaction incident to the intimacy of contact so maintained. Simply refluxing of the materials gives fair yields, but I have found that the best results are obtained by reacting the mixture under pressure in an autoclave as described above. When the reaction has been completed, the amyl amine, amylene dichloride, and amyl alcohol are removed therefrom by distillation. At least a part of the distillation is carried on under conditions of reduced pressure, The compound listed as (1) is thus believed to be formed in accordance with the following reaction:

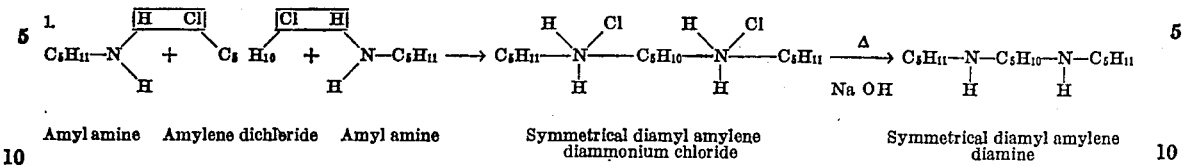

Amylamine   Amylene dichloride   Amyl amine   Symmetrical diamyl amylene diammonium chloride   Symmetrical diamyl amylene diamine the mixture being ultimately subjected to a temperature of 240° C. under a vacuum of 4 mm.

The residue remaining in the still after this treatment consists of amine hydrochlorides and the free organic bases are obtained by treating this residue with a 40% sodium hydroxide solution. The residue is preferably refluxed with the alkaline solution and the amines are separated from the remaining constituents so formed by a process of decantation.

While the reaction above described involves the use of amylene dichloride, it will be understood that other amyl halogeno compounds such as amylene difluoride or amylene dibromide may be used. It will also be understood that the invention includes both the end product amines and the amine hydrochlorides constituting the corresponding quaternary ammonium derivatives formed prior to the alkaline treatment.

While I do not wish to be limited by the correctness of any formulæ or chemical equations given for the purpose of affording a better understanding of my invention, I believe that some or all of the following chemical compounds are present and that the proportions of these compounds may be suitably varied by varying the reaction conditions.

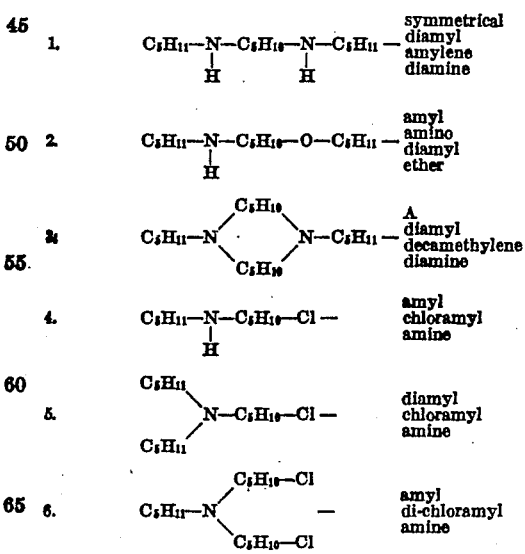

The principal reactions which are believed to result in the formation of the above mentioned compounds produce the corresponding hydrochlorides and the hydrochloride is converted into the base by the alkali treatment after the unreacted constituents have been driven off by distillation.

Similarly, the compounds listed as (2) to (6) are believed to be formed as follows, the step of forming and reducing the ammonium hydrochloride being omitted because of its similarity to the corresponding step under (1) above and for the sake of convenience and simplicity.

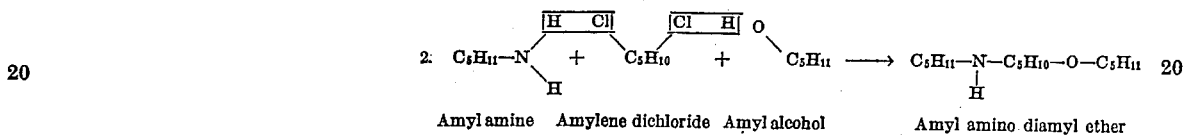

Amylamine   Amylene dichloride   Amyl alcohol   Amyl amino diamyl ether

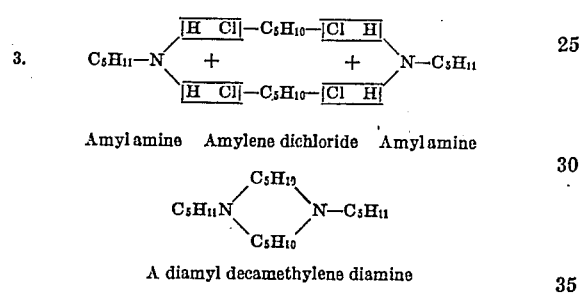

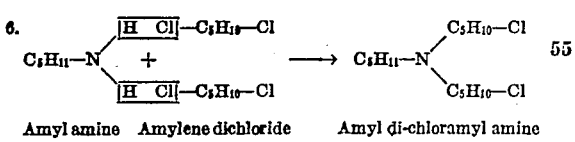

It will be understood, of course, that the amyl and amylene radicals represented above comprehend any or all of the isomeric radicals commonly designated by these terms.

While I have described the production of the compounds by the treatment of amyl amine with amylene dichloride, it will be understood that a number of them may be similarly formed by the treatment of amyl chloride with amylene diamine.

The mixture of amines produced in accordance with my invention has been found to be practically insoluble in water, but to be readily soluble in hydrocarbons such as are frequently employed in so-called "spray oils". It is also colloidally dispersible in water and readily forms an emulsion either by itself or in connection with other materials in water or in spray oils. The hydrochlorides of the mixture have been found to be insoluble in petroleum hydrocarbons but to be readily soluble in water.

As commercial insecticides these compounds have numerous advantages in that they can be manufactured simply and inexpensively and placed upon the market at low cost. The novel compounds have been found to be extremely effective as insecticides at relatively high degrees of dilution in inert material (oil and/or water). For example, one part of the free mixed bases to 800 parts inert material has been found to effect substantially 100% kill when employed in connection with a number of different species of insects. While lesser degrees of dilution are of course even more effective in destroying injurious animal life, dilutions as low as 1 to 200 or 1 to 400 have been found in certain instances to be somewhat injurious to vegetable life.

The novel compounds herein described also have other desirable physical properties for use as an insecticide. For example, they have been found to be gradually volatile. While they have a relatively high boiling point (200° to 300° C.) they possess a relatively high vapor tension at ordinary temperatures. Thus, while the new compounds are sufficiently nonvolatile to permit them to remain in contact with objects sprayed therewith for considerable periods of time so that they may have maximum effectiveness in accomplishing the purpose for which they are intended, they will gradually evaporate from objects sprayed therewith so as not to be present on fruit or vegetables sprayed therewith when they are placed upon the market. Moreover, the compounds herein referred to have been found to possess desirable spreading and adhering properties.

While the novel compounds of this invention can be used in many ways and with many diluents or vehicles in the application of these compounds as insecticides, it has been found, by way of illustration, that they may be used with great advantage in connection with so-called spray oils. The spray oils with which the compounds may be used may be of any desired composition, either containing or not containing free hydrocarbon oils, or containing or not containing soaps. For example, the free bases (insoluble in water) may be used as an emulsion in a soap solution either alone or together with an oily material. The water soluble compounds of the free bases may be used in water solutions either alone or with soaps or emulsified oils and the like. The free bases, due to their slight solubility in water, have been found to remain in place somewhat longer than the water soluble addition products and have also been found to possess somewhat more effective toxic properties. As hereinabove stated, the novel compounds described herein may be used advantageously in dilutions, for example, of one part of the mixture to 800 parts of inert material (oil, water or other diluent or vehicle).

While specific methods of manufacturing organic derivatives of ammonia have been described, it is to be understood that this has been done for purposes of illustration merely and that this invention is not to be limited thereby.

I claim:
1. The method of forming a nitrogen containing composition of matter which comprises reacting an amino substitution product of pentane chosen from the class consisting of mono-amylamine and di-amylamine, with a di-halogeno substitution product of pentane.

2. The method of forming a nitrogen containing composition of matter which comprises reacting an amino substitution product of pentane chosen from the class consisting of mono-amylamine and di-amylamine with a di-halogeno substitution product of pentane and separating the unreacted compounds from the resulting mixture.

3. The method of forming a nitrogen containing composition of matter which comprises reacting an amino substitution product of pentane chosen from the class consisting of mono-amylamine and di-amylamine with a di-halogeno substitution product of pentane, separating the unreacted compounds from the resulting mixture and treating the resulting nitrogen containing composition with an inorganic alkali metal base.

4. The method of forming a nitrogen containing composition of matter which comprises reacting an amino substitution product of pentane chosen from the class consisting of mono-amylamine and di-amylamine with a dihalogeno substitution product of pentane, at a temperature between 100° and 140° C., and a pressure of 25 to 60 pounds per square inch, one of the said substitution products being a di-substituted derivative.

5. The method of forming a nitrogen containing composition of matter which comprises reacting amyl amine with amylene di-halide.

6. The method of forming a nitrogen containing composition of matter which comprises reacting amyl amine with amylene dihalide and separating the unreacted compounds from the resulting mixture.

7. The method of forming a nitrogen containing composition of matter which comprises reacting amyl amine with amylene dihalide, separating the unreacted compounds from the resulting mixture and treating the resulting nitrogen containing composition with an inorganic alkali metal base.

8. The method of forming a nitrogen containing composition of matter which comprises reacting amyl amine with amylene dihalide at a temperature between 100 and 140° C. and a pressure between 25 and 60 pounds per square inch.

9. The nitrogen containing composition of matter formed by the method recited in claim 2.

10. The nitrogen containing composition of matter formed by the method recited in claim 3.

11. The nitrogen containing composition of matter formed by the method recited in claim 4.

12. The nitrogen containing composition of matter formed by the method recited in claim 6.

13. The nitrogen containing composition of matter formed by the method recited in claim 7.

14. A composition of matter comprising essentially a nitrogen containing compound having the following formula:

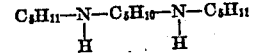

15. A composition of matter comprising essentially a nitrogen containing compound having the following formula:

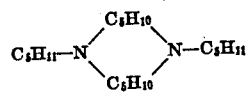

16. A composition of matter comprising essentially a nitrogen containing compound having the following formula:

$$C_5H_{11}-N-C_5H_{10}-Cl$$
$$|$$
$$H$$

17. The method of making a nitrogen containing composition of matter which comprises reacting a di-halogeno substitution product of pentane with an amino substitution product of pentane chosen from the class consisting of mono-amylamine and di-amylamine in the presence of amyl alcohol and separating the nitrogen containing composition of matter from the unreacted constituents of the mixture.

18. The method of making a nitrogen containing composition of matter which comprises reacting a di-halogeno substitution product of pentane with an amino substitution product of pentane chosen from the class consisting of mono-amylamine and di-amylamine in the presence of amyl alcohol, separating the nitrogen containing composition of matter from the unreacted constituents of the mixture, and reacting the nitrogen containing composition of matter thus formed with an inorganic alkali metal base.

19. The method of making a nitrogen containing composition of matter which comprises reacting a di-halogeno substitution product of pentane with an amino substitution product of pentane chosen from the class consisting of mono-amylamine and di-amylamine in the presence of amyl alcohol under the influence of heat and pressure and separating the nitrogen containing composition of matter from the unreacted constituents of the mixture.

20. The nitrogen containing composition of matter formed by the method recited in claim 17.

21. The nitrogen containing composition of matter formed by the method recited in claim 18.

22. The nitrogen containing composition of matter formed by the method recited in claim 19.

MELVILLE M. WILSON.